United States Patent
Lutz et al.

(10) Patent No.: US 7,433,911 B2
(45) Date of Patent: Oct. 7, 2008

(54) DATA PROCESSING APPARATUS AND METHOD FOR PERFORMING FLOATING POINT ADDITION

(75) Inventors: David Raymond Lutz, Austin, TX (US); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 832 days.

(21) Appl. No.: 11/017,217

(22) Filed: Dec. 21, 2004

(65) Prior Publication Data
US 2006/0136543 A1  Jun. 22, 2006

(51) Int. Cl.
G06F 7/483 (2006.01)
(52) U.S. Cl. .................................................. 708/505
(58) Field of Classification Search ................... 708/505
See application file for complete search history.

(56) References Cited

U.S. PATENT DOCUMENTS

| | | | |
|---|---|---|---|
| 6,088,715 A * | 7/2000 | Oberman | 708/505 |
| 6,094,668 A * | 7/2000 | Oberman | 708/505 |
| 6,366,942 B1 | 4/2002 | Badeau et al. | 708/497 |
| 6,397,239 B2 * | 5/2002 | Oberman et al. | 708/505 |
| 2002/0129075 A1 * | 9/2002 | Park et al. | 708/505 |
| 2003/0115236 A1 * | 6/2003 | Naini et al | 708/505 |

* cited by examiner

Primary Examiner—David H Malzahn
(74) Attorney, Agent, or Firm—Nixon & Vanderhye P.C.

(57) ABSTRACT

A data processing apparatus and method are provided for adding n-bit significands of first and second floating point operands to produce an n-bit result. The data processing apparatus comprises determination logic operable to determine the larger operand of the first and second operands, and alignment logic operable to align the n-bit significand of the smaller operand with the n-bit significand of the larger operand. First adder logic is then operable to perform a first sum operation in order to generate a first rounded result in non-redundant form equivalent to the addition of the aligned significands with a rounding increment injected at a first predetermined rounding position appropriate for a non-overflow condition, the first adder logic comprising a single level of adder logic. Further, second adder logic is provided to perform a second sum operation in order to generate a second rounded result in non-redundant form equivalent to the addition of the aligned significands with a rounding increment injected at a second predetermined rounding position appropriate for an overflow condition, the second adder logic also comprising a single level of adder logic. Selector logic is then used to derive the n-bit result from either the first rounded result or the second rounded result.

26 Claims, 6 Drawing Sheets

DATA PROCESSING APPARATUS AND METHOD FOR PERFORMING FLOATING POINT ADDITION

BACKGROUND OF THE INVENTION

1. Field of the Invention

The present invention relates to a data processing apparatus and method for performing floating point addition, and in particular to a data processing apparatus and method for adding first and second n-bit significands of first and second floating point operands to produce an n-bit result.

2. Description of the Prior Art

A floating point number can be expressed as follows:

$$\pm 1.x * 2^y$$

where: x=fraction
1.x=significand (also known as the mantissa)
y=exponent

Floating point addition can take two forms, namely like-signed addition (LSA) or unlike-signed addition (USA). An LSA operation is performed if two floating point operands of the same sign are to be added, or if two floating point operands of different signs are to be subtracted. Similarly, a USA operation is to be performed if two floating point operands of different sign are to be added, or if two floating point operands of the same sign are to be subtracted. When referring in the present application to the addition of floating point operands and the addition of the n-bit significands of such operands, this should be taken as collectively referring to LSA or USA computations, and accordingly it will be appreciated that such a term covers both addition and subtraction processes.

When adding the n-bit significands of two floating point operands in order to produce an n-bit result, the following steps need to be performed:
1. A determination is made as to which of the two floating point operands is the largest.
2. The n-bit significand of the smaller operand is then aligned with the n-bit significand of the larger operand.
3. In the event of a USA operation, the smaller operand is inverted and a carry-in bit to subsequent adder logic is set. For an LSA operation, no such inversion is required, and the carry-in bit is not set.
4. The two significand values, manipulated as described above, are then added to produce a non-rounded sum.
5. The non-rounded sum is then normalized (shifted so that it has the form 1.x). The exponent is adjusted accordingly.
6. The bits of the non-rounded sum to the right of the least significant result bit (the result requires only the n most significant bits) are then evaluated to determine whether rounding is appropriate.
7. Then, a rounding increment is added to the significant bits of the result dependent on the rounding evaluation performed in step 6 above.
8. The rounded sum is then normalized (shifted so that it has the form 1.x). The exponent is adjusted accordingly.

The above series of steps are inherently serial, but can be parallelised at several points. In accordance with one known prior art technique, the significands were treated as n-bit integers, and the addition circuitry was arranged such that two additions were performed in parallel, one using the input significands to generate a value "sum", and one adding a predetermined increment of +2 to the input significands to produce a value "sum+2", with the rounding evaluation also being performed in parallel. All of the possible results could then be derived from either the sum or "sum+2" values. However, the introduction of the increment value of +2 required the addition of an initial level of full adder logic to be introduced before the level of carry propagate adders used to produce the result "sum+2", which has an adverse impact on processing speed.

U.S. Pat. No. 6,366,942-B1 describes a technique for rounding floating point results in a digital processing system. The apparatus accepts two floating point numbers as operands in order to perform addition, and includes a rounding adder circuit which can accept the operands and a rounding increment bit at various bit positions. The circuit uses full adders at required bit positions to accommodate a bit from each operand and the rounding bit. Since the proper position in which the rounding bit should be injected into the addition may be unknown at the start, respective low and high increment bit addition circuits are provided to compute a result for both the low and a high increment rounding bit condition. The final result is selected based upon the most significant bit of the low increment rounding bit result. The low and high increment bit addition circuits can share a high order bit addition circuit for those high order bits where a rounding increment is not required, with this single high order bit addition circuit including half adders coupled in sequence, with one half adder per high order bit position of the first and second operands.

Hence, it can be seen that U.S. Pat. No. 6,366,942-B1 teaches a technique which enables the rounding process to be performed before the final sum result is produced, but in order to do this requires the use of a level of fall adders (i.e. adders that take three input bits and produce at their output a carry and a sum bit) and half adders before the adder logic used to produce the final sum.

Full adders typically take twice as long to generate output carry and sum bits as do half adders. As there is a general desire to perform data processing operations more and more quickly, this tends to lead to a reduction in the clock period (also referred to herein as the cycle time) within the data processing apparatus. As the cycle time reduces, the delays incurred through the use of the extra level of the full adders and half adders (and especially the delay incurred by the full adders) described above are likely to become unacceptable.

SUMMARY OF THE INVENTION

Viewed from a first aspect, the present invention provides a data processing apparatus for adding n-bit significands of first and second floating point operands to produce an n-bit result, the data processing apparatus comprising: determination logic operable to determine the larger operand of the first and second operands; alignment logic operable to align the n-bit significand of the smaller operand with the n-bit significand of the larger operand; first adder logic operable to perform a first sum operation in order to generate a first rounded result in non-redundant form equivalent to the addition of the aligned significands with a rounding increment injected at a first predetermined rounding position appropriate for a non-overflow condition, the first adder logic comprising a single level of adder logic; second adder logic operable to perform a second sum operation in order to generate a second rounded result in non-redundant form equivalent to the addition of the aligned significands with a rounding increment injected at a second predetermined rounding position appropriate for an overflow condition, the second adder logic comprising a single level of adder logic; and selector logic operable to derive the n-bit result from either the first rounded result or the second rounded result.

In accordance with the present invention, two pieces of adder logic are provided, first adder logic being arranged to perform a first sum operation to generate a first rounded result in non-redundant form equivalent to the addition of two significands with a rounding increment injected at a first predetermined rounding position appropriate for a non-overflow condition, and second adder logic being arranged to perform a second sum operation to generate a second rounded result in non-redundant form equivalent to the addition of two significands with a rounding increment injected at a second predetermined rounding position appropriate for an overflow condition. In accordance with the present invention, both the first adder logic and the second adder logic are able to produce rounded results in non-redundant form using only a single level of adder logic. Selector logic is then provided to derive an n-bit result from either the first rounded result or the second rounded result.

By generating each rounded result using a single level of adder logic, the logic in the critical timing path of the data processing apparatus is reduced, whilst allowing the rounding evaluation and any necessary rounding increment to be performed without having to first wait for the addition of the significands to take place. This technique hence provides a particularly efficient technique for adding n-bit significands of first and second floating point operands to produce a rounded n-bit result.

In one embodiment, the single level of adder logic in both the first adder logic and the second adder logic comprises carry-propagate adders. A carry-propagate adder receives two input values and produces a single output value in non-redundant form.

In one embodiment, the first adder logic and second adder logic are greater than n bits wide to enable the rounding increment to be incorporated in the addition of the aligned significands. It is often the case in particular data processing implementations that the adder logic used to perform addition operations on significands of floating point numbers is also used to perform certain other floating point computations using input values that have a greater number of bits than the significands. In such embodiments, it will be appreciated that the data processing apparatus may already provide adder logic that is greater than n bits wide, and accordingly no additional hardware cost is incurred by requiring the first adder logic and second adder logic to be greater than n bits wide in order to enable the rounding increment to be incorporated in the addition of the aligned significands.

The actual width of the first and second adder logic may vary dependent on the embodiment. However, in one embodiment, the first adder logic is at least n+2 bits wide and the second adder logic is at least n+1 bits wide. In one particular implementation, the data processing apparatus operates on single precision floating point operands, and accordingly the significands are 24 bits in length. In one particular embodiment, the first adder logic and second adder logic are actually 32 bits wide.

In one embodiment, the bit positions of the first and second predetermined rounding positions is dependent on whether the addition is a USA or an LSA. In particular, for LSAs the n-bit result produced by adding the two n-bit significands will be in the range from 1.0 to 4.0, whereas for USAs the n-bit result will be in the range from 0.5 to 2.0, and these different ranges give rise to different first and second predetermined rounding positions.

In one embodiment, the first predetermined rounding position is a guard bit position assuming the non-overflow condition exists and the second predetermined rounding position is a guard bit position assuming the overflow condition exists. The guard bit position is the bit position immediately to the right of the least significant bit of the n-bit result. Hence, the insertion of the rounding increment value at the guard bit position results in an addition of ½ ULP (Unit in the Lowest Place) to the result.

Given the above mentioned ranges for LSAs and USAs, and assuming a 32-bit adder and single precision operands (where n is 24), it will be appreciated that for LSAs the guard bit position assuming the non-overflow condition exists will be bit position 7 (where the lowest order bit position is 0), whereas the guard bit position assuming the overflow condition exists will be bit position 8. For USAs, the guard bit position assuming the non-overflow condition exists will be bit position 6 and the guard bit position assuming the overflow condition exists will be bit position 7.

In one embodiment of the present invention, the rounding increment is caused to be injected at the first and second predetermined rounding positions by manipulation of the inputs to the first and second adder logic containing the n-bit significand of the larger operand and by selective manipulation of a carry-in value to the first and second adder logic. For USAs, this can be achieved by inserting predetermined bit patterns to the right of the least significant bit of the n-bit significand of the larger operand, and without requiring any manipulation of a carry-in value. For LSAs, manipulation of the input to the first adder logic containing the n-bit significand of the larger operand involves insertion of a predetermined bit pattern to the right of the least significant bit of the n-bit significand of the larger operand without requiring any manipulation of the carry-in value. However, with regard to the manipulation required for the second adder logic, for an LSA the rounding increment is caused to be injected at the second predetermined rounding position by providing as one of the inputs to the second adder logic the n-bit significand of the larger operand with the remaining bits of the input set and with a carry-in value to the second adder logic set. This causes the rounding increment to be injected into the second predetermined rounding position, which in this particular instance is the same bit position as the least significant bit position of the n-bit significand of the larger operand.

The selector logic may be arranged in a variety of ways. However, in one embodiment, the selector logic includes overflow detection logic operable to detect the presence of the overflow condition with reference to the most significant bit of the first rounded result, if the overflow condition exists the selector logic being operable to derive the n-bit result from the second rounded result, and if the overflow condition does not exist the selector logic being operable to derive the n-bit result from the first rounded result. In particular, if the most significant bit of the first rounded result is set, this will indicate the presence of the overflow condition, whereas if the most significant bit of the first rounded result is not set, this will indicate that the overflow condition does not exist.

A number of different rounding modes exist identifying how values should be rounded in particular situations. In accordance with one embodiment of the present invention, the n-bit result is rounded in accordance with a round-to-nearest rounding mode. In accordance with the round-to-nearest rounding mode, also referred to as the "Round-to-Nearest-Even" (RNE) rounding mode, values that are more than half way between two representable results are rounded up, whilst values that are less than half way between two representable results are rounded down (or truncated). Values that are exactly half way between two representable results are rounded to a final result that has a least significant fraction bit equal to zero, thus making the result even.

It has been found that the first and second rounded results produced by the first and second adder logic may be such that when deriving the n-bit result certain adjustment of a least significant bit portion may be necessary in order to produce the appropriate result having regard to the rounding mode. For example, an n-bit result derived directly from the first or second rounded result will be correctly rounded having regard to the RNE rounding mode, with the possible exception of the least significant bit, which in one particular situation would be incorrect. In particular, for the "tie case" for the RNE rounding mode, where the value is exactly half way between two representable values, the injection of a logic one value at the guard bit position may cause a least significant bit to be incremented incorrectly.

It would be possible to provide correction logic to perform any necessary correction of the outputs produced by the first and second adder logic. However, in one embodiment an alternative approach is instead taken where the data processing apparatus further comprises least significant bit determination logic operable to determine first and second least significant bit portions for the n-bit result, the first least significant bit portion being appropriate for the non-overflow condition and the second least significant bit portion being appropriate for the overflow condition, and the selector logic being operable to derive the n-bit result from either the first rounded result and the first least significant bit portion in the event of the non-overflow condition or from the second rounded result and second least significant bit portion in the event of the overflow condition. In one particular embodiment, first and second least significant bit portions each comprise a single least significant bit.

The present invention may be applied to single precision or double precision floating point operands. However, in one embodiment, the first and second floating point operands are single precision floating point operands, and n is 24.

Viewed from a second aspect, the present invention provides a method of operating a data processing apparatus to add n-bit significands of first and second floating point operands to produce an n-bit result, the method comprising the steps of: determining the larger operand of the first and second operands; aligning the n-bit significand of the smaller operand with the n-bit significand of the larger operand; employing first adder logic to perform a first sum operation in order to generate a first rounded result in non-redundant form equivalent to the addition of the aligned significands with a rounding increment injected at a first predetermined rounding position appropriate for a non-overflow condition, the first adder logic comprising a single level of adder logic; employing second adder logic to perform a second sum operation in order to generate a second rounded result in non-redundant form equivalent to the addition of the aligned significands with a rounding increment injected at a second predetermined rounding position appropriate for an overflow condition, the second adder logic comprising a single level of adder logic; and deriving the n-bit result from either the first rounded result or the second rounded result.

BRIEF DESCRIPTION OF THE DRAWINGS

The present invention will be described further, by way of example only, with reference to an embodiment thereof as illustrated in the accompanying drawings, in which.

DESCRIPTION OF EMBODIMENTS

Figure 1:
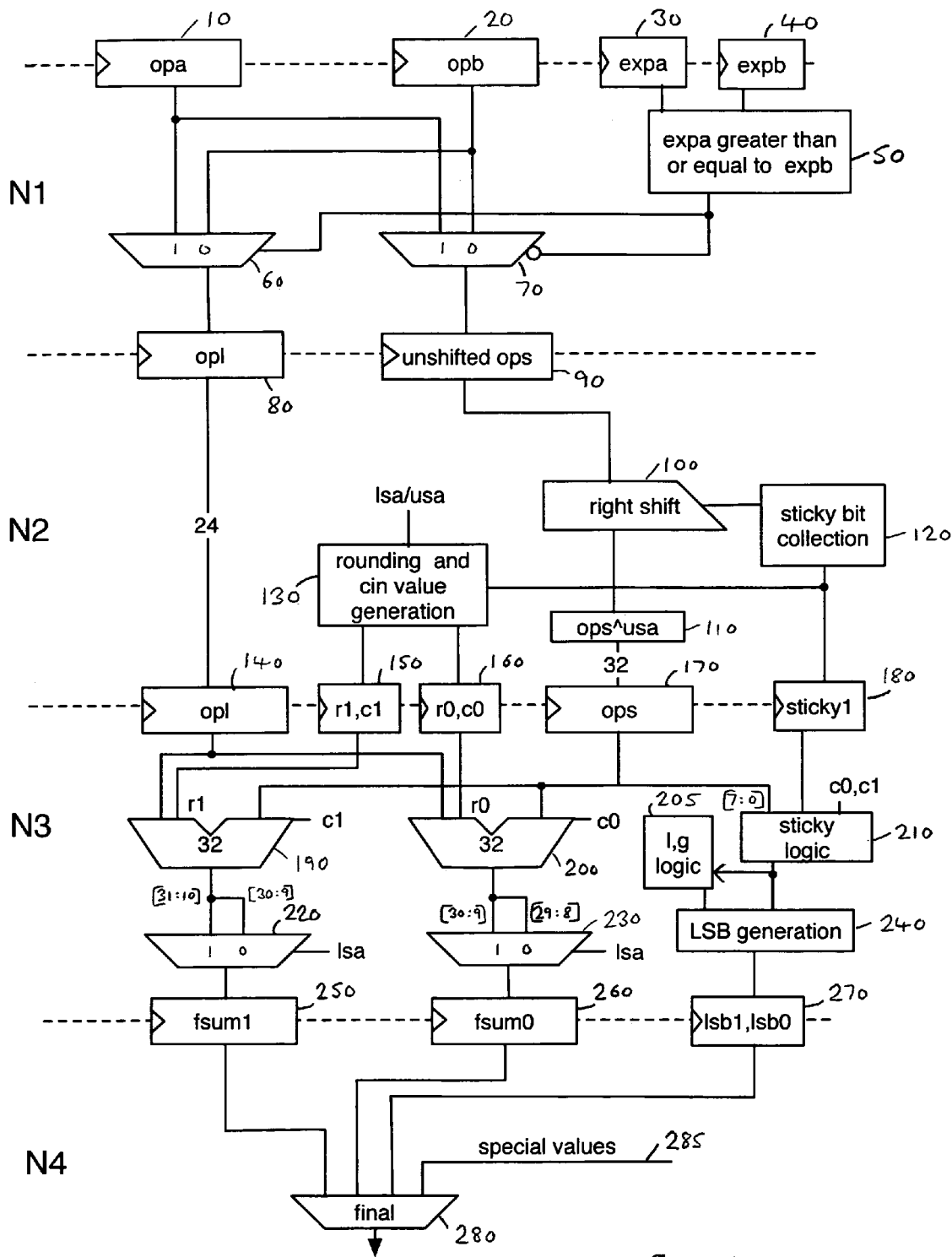
FIG. 1 is a block diagram of logic provided within a data processing apparatus in accordance with one embodiment of the present invention to produce an n-bit result when adding two n-bit significands of two floating point operands.

FIG. 1 is a block diagram illustrating logic provided within a data processing apparatus of one embodiment of the present invention to add first and second n-bit significands of two floating point operands in order to produce an n-bit final result. For the sake of illustration, it is assumed that the input operands are single precision floating point operands, and accordingly each operand consists of a 1-bit sign value, an 8-bit exponent value and 23-bit fraction value. The 23-bit fraction value will be converted into a 24-bit significand and the 24-bit significands from both floating point operands will be provided to the registers 10, 20, respectively. The corresponding exponents are stored within the registers 30, 40, respectively.

As shown in FIG. 1, the adder has a four-stage pipeline. Most of the fourth stage is used for forwarding, hence for example allowing the result to be forwarded back as an input to the addition pipeline in order to enable accumulate operations to be performed. Given that most of the fourth stage is used for forwarding, the bulk of the addition logic is provided in the first three stages.

The first stage (N1) takes the original significand values, here referred to as opa and opb, and based on an exponent comparison performed by the logic 50, generates two new operands, opl and ops. Opl is the significand of the larger operand and ops is the significand of the smaller operand. As can be seen from FIG. 1, the logic 50 determines whether the exponent of operand a is greater than or equal to the exponent of operand b and if so outputs a logic one value. If not, the logic 50 outputs a logic zero value. The multiplexer 60 receives the signal output by the logic 50, and the multiplexer 70 receives an inverted version of that output signal from the logic 50. As can be seen from FIG. 1, if the exponent a is greater than or equal to exponent b, this will cause opa to be output by multiplexer 60 as opl and opb to be output by multiplexer 70 as ops, opl being stored in register 80 and ops being stored in register 90. Similarly, if it is determined that the exponent of operand a is less than the exponent of operand b, this will cause opb to be output by multiplexer 60 as opl and opa to be output by multiplexer 70 as ops.

The second and third stages N2 and N3 are split into two data paths, referred to as the far path and the near path. Only the far path is shown in FIG. 1. The near path is used for USAs with equal exponents or exponents differing by one and significands guaranteed to differ by less than one. In such instances, no rounding of the result will be required but normalisation may be required due to massive cancellation. Such a normalisation logic is not required in the far path. However, in the far path, it is necessary to provide logic to account for rounding due to the fact that the input significands may need more than a 1-bit alignment. Such rounding logic is not required in the near path.

The near path may be constructed in a standard manner and since it does not require the provision for rounding, the discussion of the near path is not relevant to the present invention. However, in embodiments of the present invention, the far path logic is arranged to perform the required rounding using a novel technique, which will be discussed in more detail with reference to FIG. 1.

The far path illustrated in FIG. 1 handles all LSAs, and USAs that do not meet the near path criteria. In particular, any USA handled by the far path has an exponent difference of at least one, so it is guaranteed that opl-ops is positive.

In stage N2, ops is right shifted by the logic 100 by an amount corresponding to the exponent difference computed in stage N1, and is then inverted by the inverter logic 110 if the operation is a USA. If instead the operation is an LSA, no inversion is performed by the logic 110. The modified operand ops is then stored within the register 170, the register 170 being 32-bits wide in the embodiment illustrated in FIG. 1. It will be appreciated that, given that the significands for single precision floating point operands are only 24 bits wide, there is no requirement for the register 170 to be 32 bits wide, but in the particular embodiment illustrated in FIG. 1 the register 170 is 32 bits wide since the logic illustrated in FIG. 1 is used to perform other operations as well as additions, and some of these other operations require a 32-bit wide register, for example certain conversion operations.

Any bits of ops shifted past bit position zero by the right shift logic 100 are output to sticky bit collection logic 120, which performs a logical OR operation on those bits in order to produce a "sticky1" value which is then stored within the register 180.

The 24 bits of opl pass through stage N2 unchanged, and are stored at the end of stage 2 in register 140. In addition, in stage N2, two 8-bit rounding constants are produced along with associated carry-in values, by the rounding and carry-in value generation logic 130. This logic 130 receives an indication as to whether the operation is an LSA or a USA, and also receives the sticky1 value output by the logic 120. There are three possible sets of 8-bit rounding constants and associated carry-in values that may be generated by the logic 130, these three variants being illustrated in table 1 below:

TABLE 1

| Opl [7:0] | $C_{in}$ | Adds 1 at G position |
|---|---|---|
| 11111111 | 1 | 8 |
| 10000000 | (USA) AND (NOT Sticky1) | 7 |
| 01000000 | (USA) AND (NOT Sticky1) | 6 |

As shown in stage N3, two 32-bit wide adders 190 and 200 are provided. Whilst the ops value stored in register 170 is 32-bits wide, the opl value stored in register 140 is only 24 bits wide. However, in accordance with embodiments of the present invention, the 8-bit rounding value stored in register 150 is used as bits 0 to 7 of opl, with the value of opl in register 140 forming bits 8 to 31 input into the adder 190. Similarly, the 8-bit rounding value stored in register 160 is used as bits 0 to 7 of a 32-bit opl value input to adder 200, with the opl value in register 140 being used as bits 8 to 31.

The 32-bit adders 190 and 200 are present in stage N3 in order to accommodate other operations that can be performed within the addition pipeline, for example conversions, but for additions there are three 24-bit values that may need to be extracted from the 33-bit sum (i.e. 32 bits with a carry out giving the 33$^{rd}$ bit). In particular, for LSAs, the 24-bit sum is in the range 1.0 to 4.0, and so the guard bit G (the bit immediately to the right of the least significant bit of the 24-bit result of interest) will be at bit position 8 for an overflowed result or bit position 7 for a non-overflowed result. For USAs, the sum will be in the range of 0.5 to 2.0, and accordingly the guard bit will be at bit position 7 for an overflowed result or bit position 6 for a non-overflowed result.

In accordance with embodiments of the present invention, a rounding increment is introduced prior to performing the additions in the adders 190 and 200 by inserting a rounding increment at the guard bit position. With reference to the earlier described Table 1, it can be seen that the opl[7:0] value of "01000000" inserts the rounding increment at bit position 6 and hence is the appropriate choice of rounding constant to store in register 160 and provide to adder 200 in the event of a USA operation. Similarly, the opl[7:0] value "10000000" is the appropriate rounding constant to store in register 150 and then provide to adder 190 in order to insert a 1 at the guard position for the overflowed result (i.e. bit position 7).

For a USA operation, a carry-in value of 1 is added at the least significant bit of the infinitely precise sum. However, in this instance, the adders are only 32 bits wide, and the least significant bits of ops may have been shifted out by the right shift logic 100. Any such bits will have been evaluated by the sticky bit collection logic 120 when generating the sticky1 value. The sticky1 value will only be at a logic zero value if all of the bits shifted out by the logic 100 are zeros. Since this is done prior to the inversion of the operand for a USA operation by the inverter 110, this identifies the situation where all of the bits of the inverted operand were in fact all ones, which is the only situation where a carry-in value of 1 injected at the least significant bit of the infinitely precise sum will be propagated all the way up to the least significant bit processed by the 32-bit adder 190, 200. Hence as shown in Table 1, it can be seen that for both of the lower two entries in the table, the carry-in value is derived by the computation (USA) AND (NOT Sticky1).

For like signed additions, it can be seen that the appropriate rounding constant to store in register 160 and then provide to adder 200 is "10000000" since this will add a 1 at bit 7, i.e. the guard bit position for an underflowed result. For an overflowed result, the rounding increment needs to be injected at bit position 8, which is the bit position containing the least significant bit of opl stored in register 140. Accordingly, the addition of this increment value is achieved by setting opl[7:0] to "11111111" and setting the carry-in value to 1, thereby causing a logic one value to be propagated through the adder 190 into bit position 8.

Hence, given the above description, it can be seen that in stage N2 the logic 130 generates the appropriate rounding constants and carry-in values for storing in the registers 150 and 160. Then, in stage N3, the 32-bit adders 190 and 200 receive two 32-bit input values and produce a 33-bit output (bits 0 to 32). For each of the outputs from the adders 190, 200, the actual bits of interest will depend on whether the operation was a USA or an LSA operation. Considering first the output from the adder 200, bits 29 to 8 will represent the most significant 22 bits of the fraction of the result for a USA result, whereas bits 30 to 9 will represent the 22 most significant bits of the fraction for an LSA result. Accordingly, bits 29 to 8 are routed to the right hand input of multiplexer 230 and bits 30 to 9 are input to the left hand input of multiplexer 230, with the output being driven dependent on a signal which is set for a like signed addition. The resultant 22 bits are then stored as fsum0 in register 260 at the end of stage N3.

Similarly, with regard to the output from adder 190, bits 30 to 9 will represent the 22 most significant bits of the fraction for a USA result, and bits 31 to 10 will represent the most significant 22 bits of the fraction for an LSA result. Accordingly, bits 30 to 9 are routed to the right hand side input of multiplexer 220 and bits 31 to 10 are routed to the left hand side input of multiplexer 220, with the selection being made dependent on whether the addition is a like signed addition or an unlike signed addition. The output from the multiplexer 220 is stored as fsum1 within the register 250.

During stage N3, bits 0 to 7 of ops stored in register 170 are input to sticky logic 210, which also receives the sticky1 value from register 180, and the carry-in values being supplied to the adders 190 and 200. Using this information, the sticky logic 210 generates two sets of first and second sticky values, the first sticky value being for the no overflow case and the second sticky value being for the overflow case. The first set of values is for USA operations and the second set is for LSA operations. The operation of the sticky logic 210 will be discussed in more detail later with reference to FIGS. 2A and 2B.

L and G logic 205 is operable to derive L and G bits for both LSA and USA operations and for both non-overflowed and overflowed results, this logic being discussed in more detail later with reference to FIGS. 3A and 3B.

LSB generation logic 240 is arranged to receive the sticky values output by the sticky logic 210 and L and G values output by logic 205. Based on this information, the LSB generation logic 240 generates first and second least significant bits, LSB1 being the least significant bit for the overflow condition, and LSB0 being the least significant for the non-overflow condition. The operation of the LSB generation logic 240 will be discussed in more detail later with reference to FIG. 4.

In stage N4, the multiplexer 280 is arranged to select fsum1 if the overflow condition is detected or fsum0 if the overflow condition is not detected, and to combine the selected sum value with its corresponding least significant bit value output from the register 270. The presence of the overflow condition can be determined by looking at the most significant bit of the result produced by the adder 200, and accordingly this most significant bit (bit 32 for LSAs and bit 31 for USAs) can be used to drive the multiplexer 280.

Path 285 is provided to enable special values to be input to the multiplexer 280, such as may be appropriate, for example, if at the time the input operands are evaluated a special case is detected, for example a NaN (Not-a-Number), infinities, and zeros.

It has been found that the rounded results produced by the carry propagate adders 190 and 200 produced using a forced injection of a logic one value at the guard position will be correctly rounded having regard to the RNE rounding mode, with the possible exception of the least significant bit, which in one particular situation would be incorrect. In particular, for the "tie case" for the RNE rounding mode, where the value is exactly half way between two representable values, the injection of a logic one value at the guard bit position may cause a least significant bit to be incremented incorrectly.

It would be possible to provide correction logic to perform any necessary correction of the outputs produced by the adders 190, 200. However, in the embodiment of the present invention illustrated in FIG. 1, an alternative approach is instead taken where sticky logic 210, L and G logic 205 and LSB generation logic 240 are used to calculate, in parallel with the additions performed by the adders 190 and 200, the actual least significant bits appropriate for both the sum produced by adder 190 and the sum produced by adder 200. This is possible since these values can be readily derived using a certain subset of the information stored in registers 140, 150, 160, 170 and 180 at the end of stage N2. The logic units 205, 210 and 240 will now be described in more detail with reference to FIGS. 2A, 2B, 3A, 3B and 4.

Figure 2A:
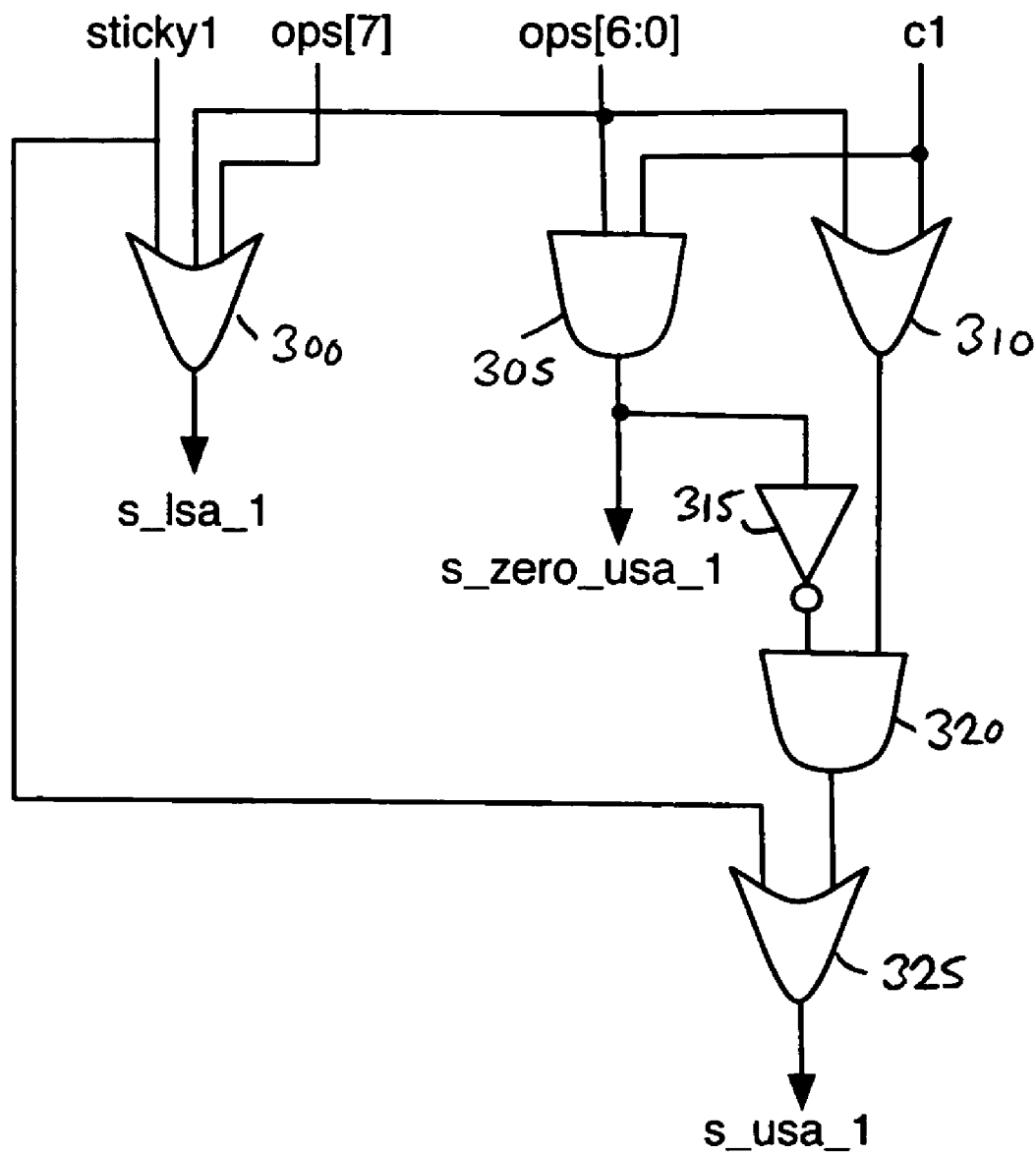
FIGS. 2A and 2B are diagrams illustrating the components provided within the sticky logic 210 of FIG. 1 in accordance with one embodiment of the present invention.
Figure 2B:
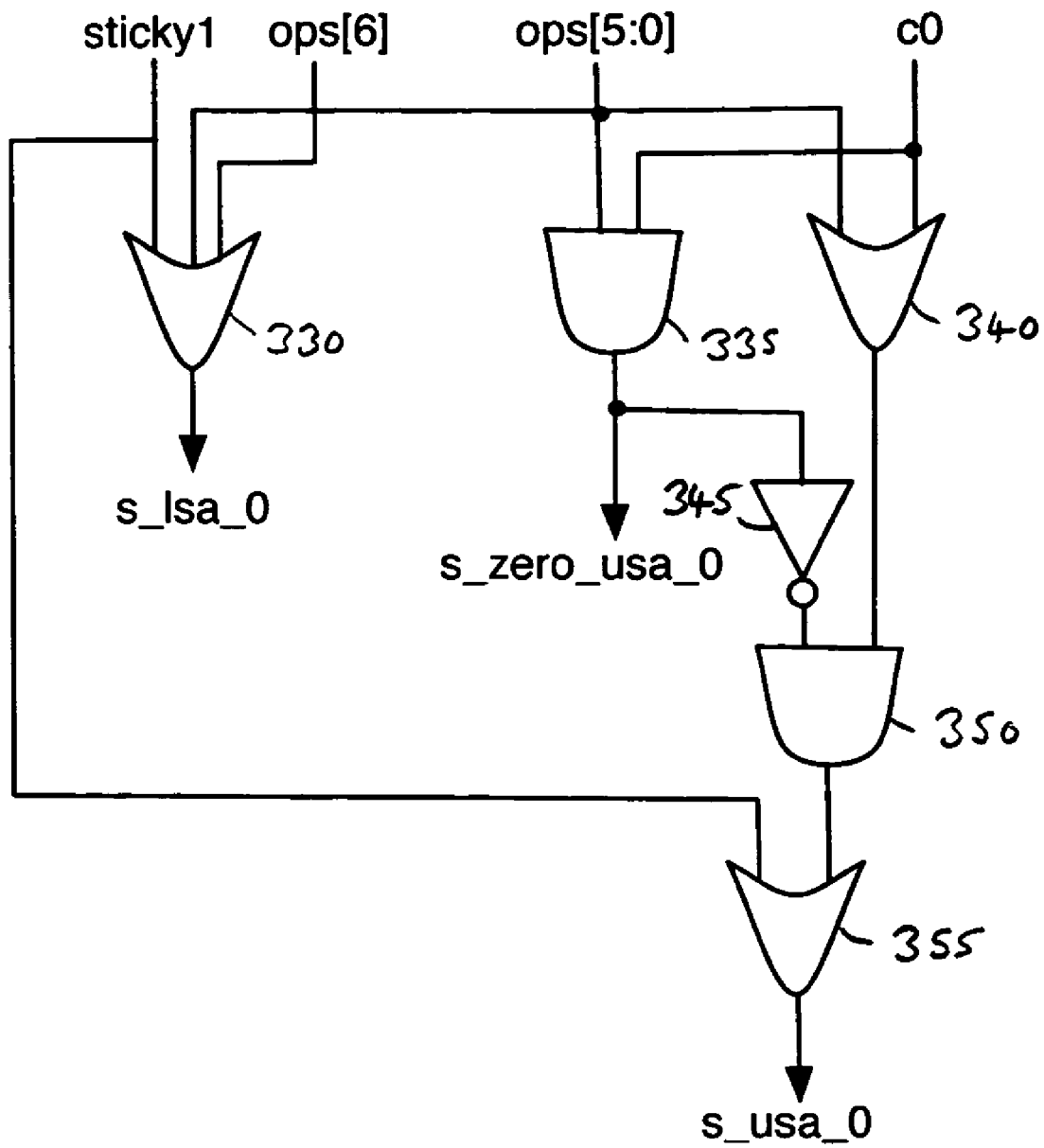

FIGS. 2A and 2B illustrate components provided within the sticky logic 210 of FIG. 1 in accordance with one embodiment. It should be noted that the OR and AND gates illustrated in FIGS. 2A and 2B represent OR and AND functions, respectively, and do not necessarily indicate a single structural gate. For example, in FIG. 2A, each of the logic elements 300, 305 and 310 would typically be implemented by multiple gates. As shown in FIG. 2A, OR gate 300 is arranged to receive the least significant bits 0 to 7 of ops and the sticky1 value and to perform a logical OR computation in order to produce a sticky value applicable for a like signed add operation performed by adder 190 (i.e. the adder that produces a result for the overflow condition), this signal being referred to as s_lsa_1. For an unlike signed addition operation, the carry in signal c1 also needs to be considered. OR gate 310 receives the carry-in signal c1 and bits 0 to 6 of ops (i.e. the bits that, along with the sticky1 value, may contribute to a sticky value for an overflowed result), and computes a value equivalent to the logical OR of its inputs.

If bits 0 to 6 of ops are all set to one and the carry-in signal c1 is set to one, then it will be appreciated that the adder 190 will produce an output result in which bits 0 to 6 (i.e. the bits used in combination with the sticky1 value to derive the sticky bit of the result) are all set to zero, with a one value being propagated into bit position 7. AND gate 305 detects such a situation, and produces an output signal s_zero_usa_1, which hence is set if the bits 0 to 6 produced by adder 190 when performing a USA operation are zero.

AND gate 320 receives the output from OR gate 310 and the inverted output from AND gate 305, the inversion being caused by inverter 315. Hence, it can be seen that this will cause the output from OR gate 310 to be propagated to the output of the AND gate 320 except in the situation where s_zero_usa_1 is set, in which case a zero value will be output from the AND gate 320.

Finally, OR gate 325 performs a logical OR operation on the output from AND gate 320 and the sticky1 signal in order to produce a sticky value appropriate for a USA operation performed by adder 190, hereafter called s_usa_1.

The circuitry of FIG. 2B operates in an identical manner to produce a sticky bit for like signed add operations and a sticky bit for unlike signed operations performed by adder 200 (i.e. the adder that produces a result for the non-overflow condition), hereafter referred to as s_lsa_0 and s_usa_0, respectively. For the operation performed by adder 200, it will be appreciated that bits 5 to 0 of ops will contribute to the sticky bit for a USA operation whilst bits 6 to 0 of ops will contribute to the sticky bit for an LSA operation. In a similar way to FIG. 2A, the circuitry of FIG. 2B also produces a signal indicating whether bits 0 to 5 produced by adder 200 when performing a USA operation are zero (s_zero_usa_0).

Figure 3A:
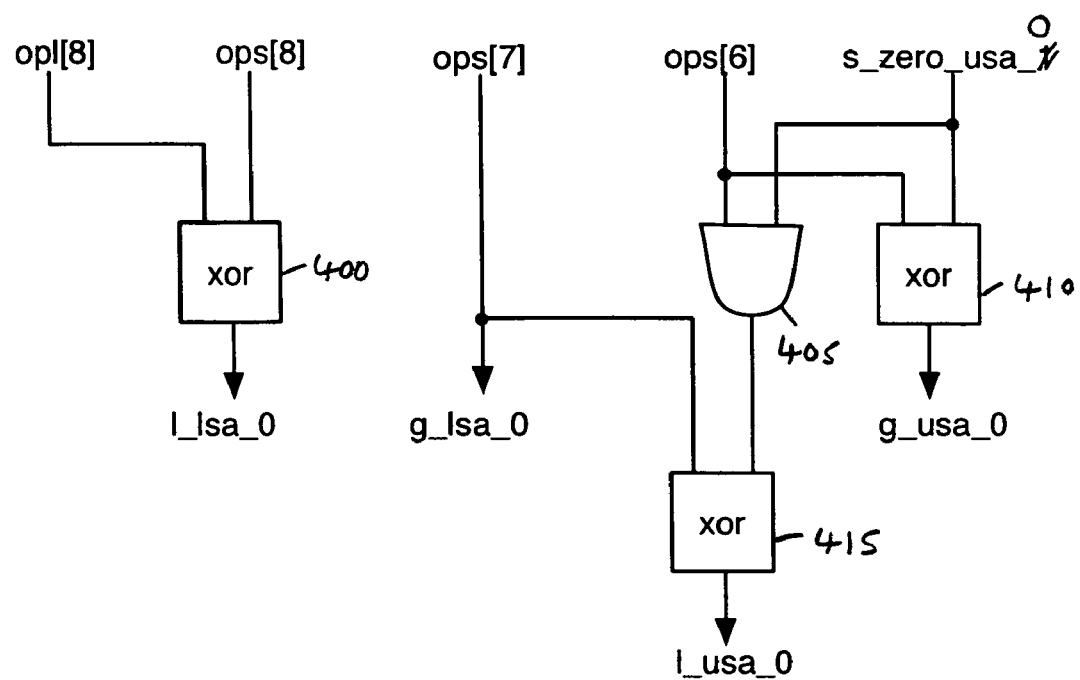
FIGS. 3A and 3B are diagrams illustrating components provided within the least significant bit and guard logic 205 of FIG. 1 in accordance with one embodiment of the present invention.
Figure 3B:
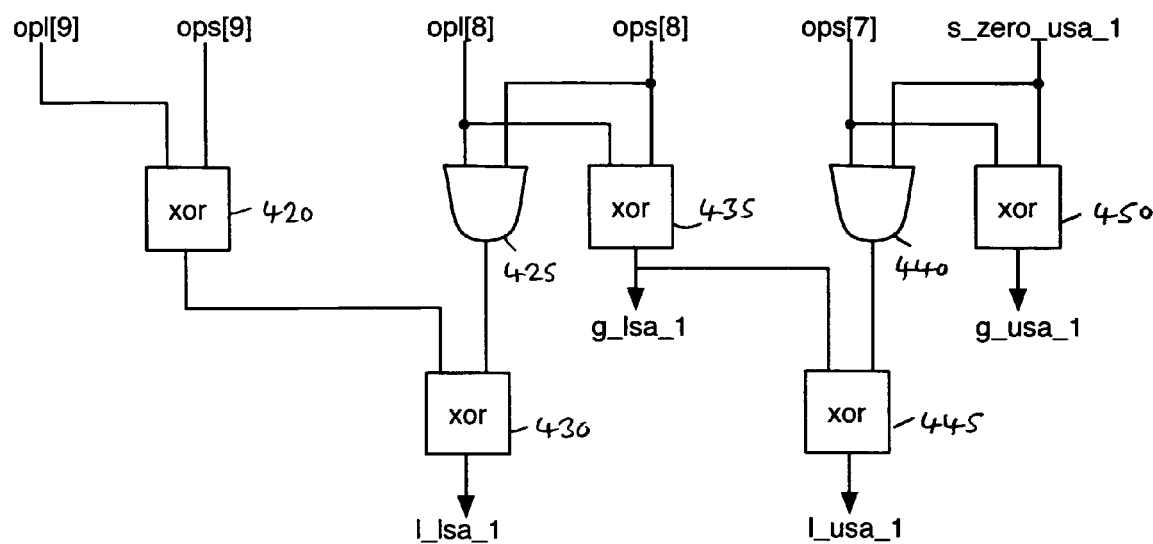

FIGS. 3A and 3B show logic provided within the L and G logic 205 of FIG. 1 in accordance with one embodiment of the present invention. This logic is arranged to receive as inputs bits 9 and 8 of opl and bits 9 to 6 of ops, and additionally receives the two values s_zero_usa_0 and s_zero_usa_1 produced by the sticky logic 210.

Considering first FIG. 3A, the L bit appropriate for an LSA operation performed by adder 200, namely l_lsa_0 is given by a logical XOR operation performed on opl[8] and ops[8], this operation being performed by the logic 400. Hence, if either of these two inputs is at a logic one value, then a logic one value will be output, unless both bits are at a logic one value, in which case the L bit will be set to zero.

The guard bit g_lsa_0 applicable to an LSA operation performed by adder 200 is given by ops[7]. With regard to a USA operation performed by adder 200, the guard bit g_usa_0 is given by the output of XOR logic 410, which receives as inputs ops[6] and s_zero_usa_0. Ops[6] is the guard bit position for such a USA operation. Hence, g_usa_0 is given by ops[6] unless s_zero_usa_0 is set (indicating a carry-out from bit position 5 to bit position 6), in which event the XOR gate 410 will in effect invert the value of the ops[6] when generating g_usa_0.

AND gate 405 outputs a logic one value if ops[6] is set and s_zero_usa_0 is set, since this will indicate a situation in which a carry-out from bit position 6 to bit position 7 will occur. In that case, the XOR gate 415 inverts the value of ops[7] when generating the 1_usa_0 value. In all other situations, AND gate 405 produces a logic zero value, and accordingly 1_usa_0 is given directly by ops[7].

FIG. 3B illustrates the logic provided to produce L and G bits appropriate to LSA and USA operations performed by adder 190 (i.e. the adder used to produce results for the overflow condition). Referring to FIG. 3B, it can be seen by comparison of logic 405, 410 and 415 of FIG. 3A and logic 440, 450 and 445 of FIG. 3B that 1_usa_1 and g_usa_1 are generated in an analogous way to 1_usa_0 and g_usa_0. The inputs to AND gate 440 and XOR gate 450 are ops[7] and s_zero_usa_. The first input to XOR gate 445 is generated by the output of XOR gate 435, which receives as inputs opl[8] and ops[8]. Hence, if one of these two inputs is set, then a logic one value is output as an input to XOR gate 445 used in the derivation of 1_usa_1, whereas otherwise a logic zero value is input to XOR gate 445.

The output from XOR gate 435 also directly forms the guard bit (g_lsa_1) appropriate for a LSA operation performed by adder 190.

The 1_lsa_1 value is given by the logical XOR of opl[9] and ops[9] (performed by XOR gate 420), unless the output of AND gate 425 is set to a logic one value, in which event XOR gate 430 will invert the output from XOR gate 420. AND gate 425 will output a logic one value if both opl[8] and ops[8] are set, since this would cause a carry-in to bit position 9.

Figure 4:
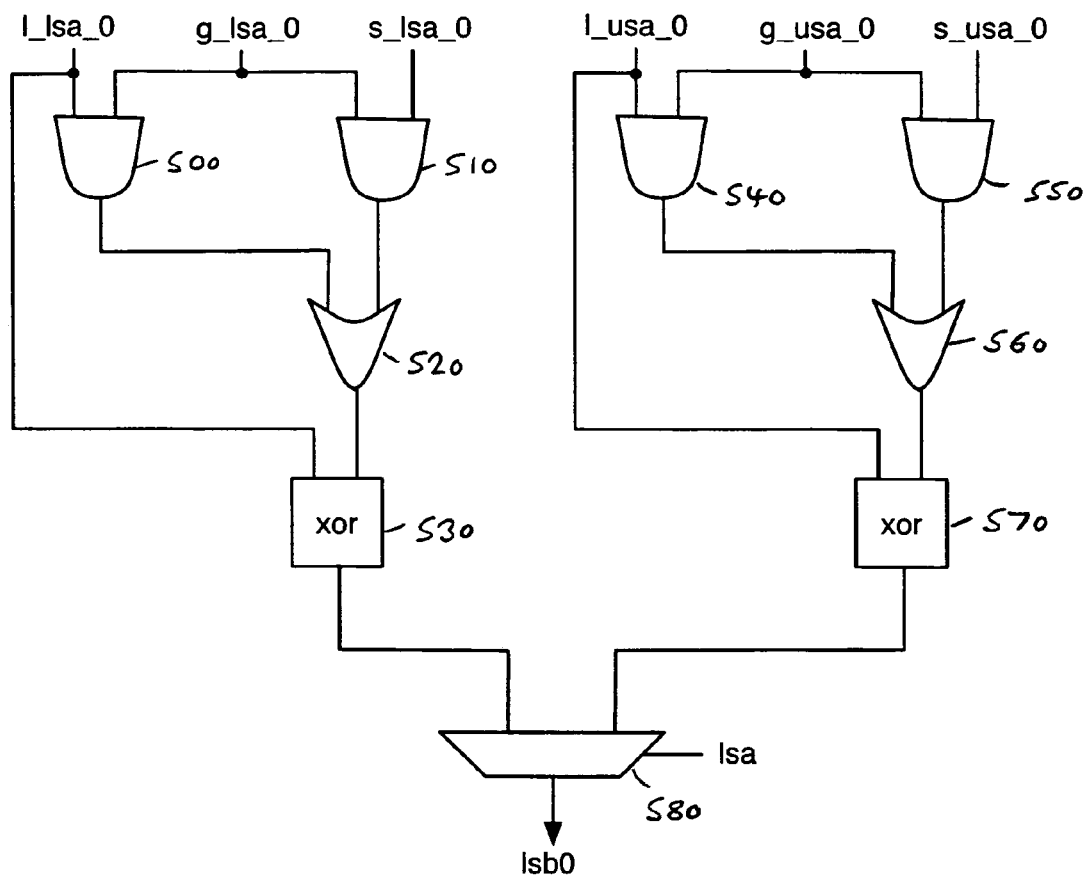
FIG. 4 is a block diagram illustrating components provided within the LSB generation logic 240 of FIG. 1 in accordance with one embodiment of the present invention.

FIG. 4 is a diagram schematically illustrating the circuitry provided within LSB generation logic 240 to produce the least significant bit lsb0 appropriate for combination with the value fsum0 to produce the final rounded n-bit significand. Having regard to the RNE rounding mode, rounding is in fact required if the result of the following computation is set:

(L AND G) OR (G AND S).

It can be seen from FIG. 4 that AND gates 540, 550 and OR gate 560 perform this computation for the L, G and S bits appropriate for an unlike signed addition in adder 200, whilst AND gates 500, 510 and OR gate 520 performs this computation for the L, G and S bits applicable for a like signed addition operation in adder 200. The function of XOR gates 530 and 570 is to pass the corresponding L bit unamended as their output, unless the above rounding computation produces a set result, in which event the corresponding least significant bit is inverted at the output of XOR gates 530, 570. The two resultant values are then forwarded to multiplexer 580, which selects between them based on a control signal indicating whether the adder 200 has in fact performed an LSA or a USA operation in order to output the value lsb0.

An identical piece of logic is also provided within the LSB generation logic 240 for producing the value lsb1, i.e. the least significant bit appropriate for combination with fsum1 stored in register 250. In this piece of logic, it will be appreciated that the L, G and S bits input are those applicable for like signed add and unlike signed add operations performed by the adder 190.

From the above description, it will be seen that a data processing apparatus has been described in which evaluation and any necessary rounding increment can be performed without first having to wait for the addition of the significands to take place. Results are produced for both the non-overflow condition and the overflow condition, with the appropriate result being selected in the final stage N4.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for adding n-bit significands of first and second floating point operands to produce an n-bit result, the data processing apparatus comprising:
   determination logic operable to determine the larger operand of the first and second operands;
   alignment logic operable to align the n-bit significand of the smaller operand with the n-bit significand of the larger operand;
   first adder logic operable to perform a first sum operation in order to generate a first rounded result in non-redundant form equivalent to the addition of the aligned significands with a rounding increment injected at a first predetermined rounding position appropriate for a non-overflow condition, the first adder logic comprising a single level of adder logic;
   second adder logic operable to perform a second sum operation in order to generate a second rounded result in non-redundant form equivalent to the addition of the aligned significands with a rounding increment injected at a second predetermined rounding position appropriate for an overflow condition, the second adder logic comprising a single level of adder logic; and
   selector logic operable to derive the n-bit result from either the first rounded result or the second rounded result.

2. A data processing apparatus as claimed in claim 1, wherein the single level of adder logic in both the first adder logic and the second adder logic comprises carry-propagate adders.

3. A data processing apparatus as claimed in claim 1, wherein the first adder logic and second adder logic are greater than n bits wide to enable the rounding increment to be incorporated in the addition of the aligned significands.

4. A data processing apparatus as claimed in claim 3, wherein the first adder logic is at least n+2 bits wide and the second adder logic is at least n+1 bits wide.

5. A data processing apparatus as claimed in claim 1, wherein the bit positions of the first and second predetermined rounding positions is dependent on whether the addition is an unlike signed addition or a like signed addition.

6. A data processing apparatus as claimed in claim 1, wherein the first predetermined rounding position is a guard bit position assuming the non-overflow condition exists and the second predetermined rounding position is a guard bit position assuming the overflow condition exists.

7. A data processing apparatus as claimed in claim 1, wherein the rounding increment is caused to be injected at the first and second predetermined rounding positions by manipulation of the inputs to the first and second adder logic containing the n-bit significand of the larger operand and by selective manipulation of a carry-in value to the first and second adder logic.

8. A data processing apparatus as claimed in claim 7, wherein for a like signed addition the rounding increment is caused to be injected at the second predetermined rounding position by providing as one of the inputs to the second adder logic the n-bit significand of the larger operand with the remaining bits of the input set and with a carry-in value to the second adder logic set.

9. A data processing apparatus as claimed in claim 1, wherein the selector logic includes overflow detection logic operable to detect the presence of the overflow condition with reference to the most significant bit of the first rounded result, if the overflow condition exists the selector logic being operable to derive the n-bit result from the second rounded result, and if the overflow condition does not exist the selector logic being operable to derive the n-bit result from the first rounded result.

10. A data processing apparatus as claimed in claim 1, wherein the n-bit result is required to be rounded in accordance with a round-to-nearest rounding mode.

11. A data processing apparatus as claimed in claim 1, further comprising least significant bit determination logic operable to determine first and second least significant bit portions for the n-bit result, the first least significant bit portion being appropriate for the non-overflow condition and the second least significant bit portion being appropriate for the overflow condition, and the selector logic being operable to derive the n-bit result from either the first rounded result and the first least significant bit portion in the event of the non-overflow condition or from the second rounded result and second least significant bit portion in the event of the overflow condition.

12. A data processing apparatus as claimed in claim 11, wherein the first and second least significant bit portions each comprise a single least significant bit.

13. A data processing apparatus as claimed in claim 1, wherein the first and second floating point operands are single precision floating point operands, and n is 24.

14. A method of operating a data processing apparatus to add n-bit significands of first and second floating point operands to produce an n-bit result, the method comprising the steps of:
   determining the larger operand of the first and second operands;
   aligning the n-bit significand of the smaller operand with the n-bit significand of the larger operand;
   employing first adder logic to perform a first sum operation in order to generate a first rounded result in non-redundant form equivalent to the addition of the aligned significands with a rounding increment injected at a first predetermined rounding position appropriate for a non-overflow condition, the first adder logic comprising a single level of adder logic;
   employing second adder logic to perform a second sum operation in order to generate a second rounded result in non-redundant form equivalent to the addition of the aligned significands with a rounding increment injected at a second predetermined rounding position appropriate for an overflow condition, the second adder logic comprising a single level of adder logic; and
   deriving the n-bit result from either the first rounded result or the second rounded result.

15. A method as claimed in claim 14, wherein the single level of adder logic in both the first adder logic and the second adder logic comprises carry-propagate adders.

16. A method as claimed in claim 14, wherein the first adder logic and second adder logic are greater than n bits wide to enable the rounding increment to be incorporated in the addition of the aligned significands.

17. A method as claimed in claim 16, wherein the first adder logic is at least n+2 bits wide and the second adder logic is at least n+1 bits wide.

18. A method as claimed in claim 14, wherein the bit positions of the first and second predetermined rounding positions is dependent on whether the addition is an unlike signed addition or a like signed addition.

19. A method as claimed in claim 14, wherein the first predetermined rounding position is a guard bit position assuming the non-overflow condition exists and the second predetermined rounding position is a guard bit position assuming the overflow condition exists.

20. A method as claimed in claim 14, wherein the rounding increment is injected at the first and second predetermined rounding positions by manipulation of the inputs to the first and second adder logic containing the n-bit significand of the larger operand and by selective manipulation of a carry-in value to the first and second adder logic.

21. A method as claimed in claim 20, wherein for a like signed addition the rounding increment is injected at the second predetermined rounding position by providing as one of the inputs to the second adder logic the n-bit significand of the larger operand with the remaining bits of the input set and with a carry-in value to the second adder logic set.

22. A method as claimed in claim 14, wherein the deriving step comprises the steps of:
   detecting the presence of the overflow condition with reference to the most significant bit of the first rounded result;
   if the overflow condition exists deriving the n-bit result from the second rounded result; and
   if the overflow condition does not exist deriving the n-bit result from the first rounded result.

23. A method as claimed in claim 14, wherein the n-bit result is rounded in accordance with a round-to-nearest rounding mode.

24. A method as claimed in claim 14, further comprising the steps of:
   determining first and second least significant bit portions for the n-bit result, the first least significant bit portion being appropriate for the non-overflow condition and the second least significant bit portion being appropriate for the overflow condition; and
   at said deriving step, deriving the n-bit result from either the first rounded result and the first least significant bit portion in the event of the non-overflow condition or from the second rounded result and second least significant bit portion in the event of the overflow condition.

25. A data processing apparatus as claimed in claim 24, wherein the first and second least significant bit portions each comprise a single least significant bit.

26. A method as claimed in claim 14, wherein the first and second floating point operands are single precision floating point operands, and n is 24.

* * * * *